(12) United States Patent
Forsythe (10) Patent No.: US 7,307,645 B2
(45) Date of Patent: Dec. 11, 2007

(54) DIMMER FUNCTION FOR EL DISPLAYS

(75) Inventor: Lawrence D. Forsythe, Milton (CA)

(73) Assignee: Psion Teklogix Inc., Mississauga (CA)

( * ) Notice: Subject to any disclaimer, the term of this patent is extended or adjusted under 35 U.S.C. 154(b) by 476 days.

(21) Appl. No.: 10/896,055

(22) Filed: Jul. 22, 2004

(65) Prior Publication Data
US 2005/0057458 A1    Mar. 17, 2005

Related U.S. Application Data

(60) Provisional application No. 60/488,794, filed on Jul. 22, 2003.

(51) Int. Cl.
*G09G 5/10* (2006.01)
(52) U.S. Cl. .......................... 345/690; 345/77; 345/102
(58) Field of Classification Search ................ 345/589, 345/601, 36, 45, 63, 691, 207, 76, 77, 79, 345/102, 690; 348/673, 687
See application file for complete search history.

(56) References Cited

U.S. PATENT DOCUMENTS

| | | | | |
|---|---|---|---|---|
| 5,736,973 A | * | 4/1998 | Godfrey et al. | ............. 345/102 |
| 6,337,542 B1 | | 1/2002 | Hanaki et al. | |
| 6,483,245 B1 | * | 11/2002 | Weindorf et al. | ............. 315/82 |
| 6,812,649 B2 | * | 11/2004 | Kim | ............................ 315/149 |
| 2002/0057061 A1 | * | 5/2002 | Mueller et al. | ............. 315/291 |
| 2002/0126113 A1 | * | 9/2002 | Iwasaki | ...................... 345/211 |
| 2003/0043137 A1 | * | 3/2003 | Nakamura | .................. 345/207 |
| 2003/0184237 A1 | | 10/2003 | Togashi et al. | |
| 2003/0214242 A1 | | 11/2003 | Berg-Johansen | |

* cited by examiner

*Primary Examiner*—Amr A. Awad
*Assistant Examiner*—Dennis P Joseph
(74) *Attorney, Agent, or Firm*—Brett J. Slaney; John R. S. Orange; Blake, Cassels & Graydon LLP (57) ABSTRACT

A control circuit to vary the intensity of an electro luminescent display. The circuit is connected between a power source and a display and comprises a pair of conductors to be connected to the display for applying a voltage from a voltage generator. A switch controls application of the voltage from the generator to the conductors. A gating circuit connects selectively one or other of the conductors to the voltage source. A controller operates upon the switch to vary the duty cycle and upon the gating circuit to alternate periodically the relative polarity of the conductors. The voltage source includes an inductor and the switch controls current flow through said inductor.

12 Claims, 5 Drawing Sheets

DIMMER FUNCTION FOR EL DISPLAYS

This application claims priority from U.S. application Ser. No. 60/488,794 filed on Jul. 22, 2003, the contents of which are incorporated herein by reference.

FIELD OF THE INVENTION

The present invention relates to a dimmer function for use with a display device such as an EL (electroluminescence) display.

BACKGROUND OF THE INVENTION

EL displays are frequently used to display images such as graphics, text and other types of visual information under ambient light conditions which can vary greatly. In high intensity ambient light conditions, it may become difficult to properly view the images displayed on the EL display. As well, under low ambient light conditions, the images displayed on the EL display may be overly bright.

Accordingly, it is helpful if the EL display is controlled by a dimmer so that image brightness may be increased when the intensity of the ambient light is high. When the intensity of ambient light is low, the brightness of the image may be decreased. The intensity of the display is a function of the maximum voltage applied and in the art the voltage is controlled by a silicon controlled rectifier (SCR). Control of SCR is difficult and has a significant power consumption. Moreover, with portable devices the battery voltage used as a power source will also vary over time and accordingly the intensity of the display tends to fluctuate with the battery voltage.

Accordingly, it is an object of the present application to obviate or mitigate the above disadvantages.

SUMMARY OF THE INVENTION

The present invention seeks to provide a solution to the problem of maintaining and adjusting the intensity of a display as a power source varies.

In one aspect, the present invention provides a control circuit to vary the intensity of an electro luminescent display. The circuit is connected between a power source and a display and comprises a pair of conductors to be connected to said display for applying a voltage thereto, an inductor connected to the power source, a switch to control current flow through the inductor from the power source to the conductors, a gating circuit to connect selectively one or other of said conductors to power source, and a controller operating upon the switch to vary the duty cycle thereof and operating upon the gating circuit to alternate periodically the relative polarity of conductors, wherein the gating circuit includes a selectively operable discharge path for each of the conductors, the discharge path including a current limiting element; and the inductor supplies the current flow directly to the conductors through the gating circuit.

An embodiment of the invention will now be described by way of example only with reference to the following detailed description in which reference is made to the following appended drawings, in which:

DETAILED DESCRIPTION OF THE INVENTION

Figure 1:
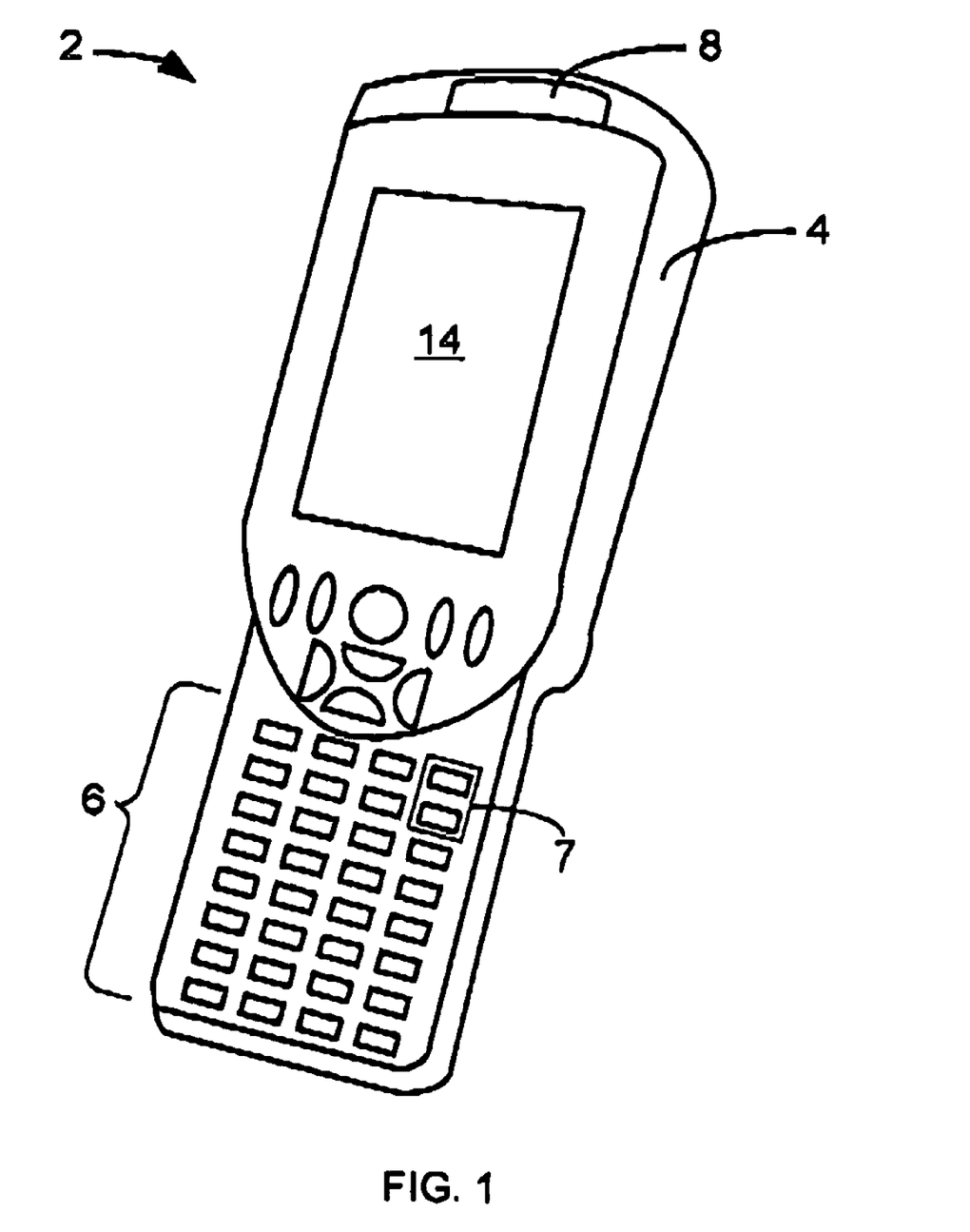
FIG. 1 is a perspective view of a hand held scanner.

Referring to FIG. 1, there is shown a hand held scanner 2 having a body 4 and a display 14. The scanner may include an input device, such as keypad 6, and is used to read and store information from barcodes or the like through a scanner window 8. The body 4 contains control and data acquisition components as well as a voltage source 9 (FIG. 2) to supply power to the device. The scanner 2 may be used in a variety of environments in which different levels of intensity for the display 14 are desirable.

Figure 2:
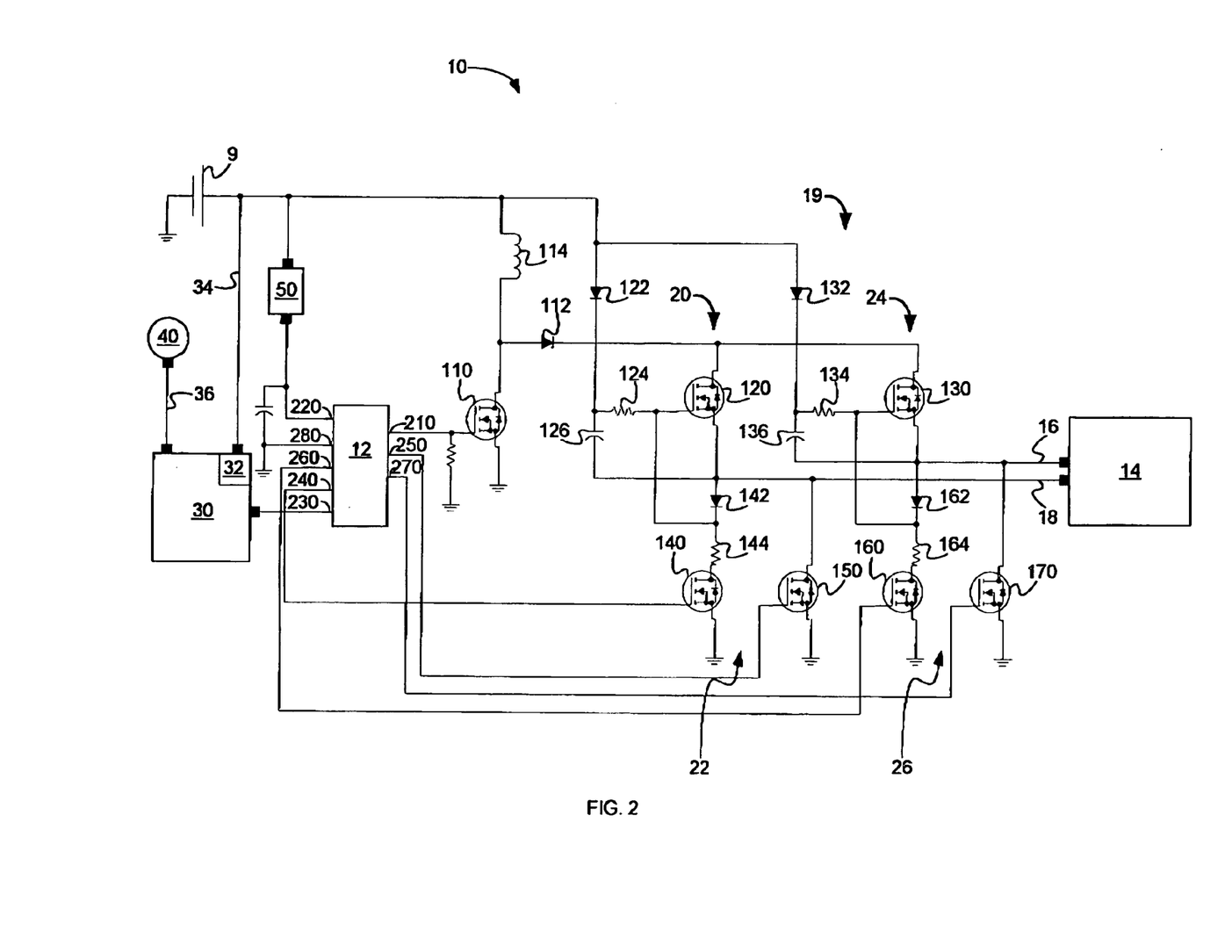
FIG. 2 is a schematic diagram of a dimmer circuit utilized in the scanner of FIG. 1.

The keypad 6 includes a manual dimmer control 7 for use in setting a dimmer circuit 10 controlling the amplitude of voltage applied to an EL display 14 through a pair of conductors or lines 16, 18 shown in FIG. 2. The dimmer circuitry 10 includes an inductor 114, that is supplied with power from the voltage source 9 at a nominal voltage. A N-chanel FET 110 controls current flow through the inductor 114, which is connected in parallel to an H-bridge 19 having four legs 20, 22, 24, 26. One pair of legs 20, 22 controls the voltage to line 16 connected to display 14 and the other pair 24, 26 controls the voltage applied to line 18 connected to display 14. The voltage applied across the lines 16, 18 determines the intensity of the display 14. The voltage in lines 16, 18 is also controlled by FETs 170, 150 respectively.

Each of the legs 20, 22, 24, 26 includes an N-chanel FET 120, 140, 130, 160 respectively. Current flow between legs 20, 22 and 24, 26 is controlled by diodes 142, 162 and within each leg by resistors 124, 134, 144, 164.

The operation of the H-bridge 19 is controlled through a microprocessor 12, which interfaces with the main processor 30 of the scanner 2. The microprocessor 12 is grounded by line 280 and connected through line 220 to voltage regulator 50. The N-chanel FETs 140, 150, 160, 170 are switched by control lines 240, 250, 260, 270 respectively from the microprocessor 12 to direct the inductor flyback energy into the EL display 14 through lines 16, 18. The microprocessor 12 also controls the state of N-channel FET 110 through control line 210 to regulate the charging and discharging of the inductor 114.

The H-bridge 19 capacitors 126, 136 are used to store a charge so that N-channel FETs 120, 130 may be turned ON. These capacitors 126, 136 are required to ensure that N-channel FETs 120, 130 maintain a positive voltage from gate to source. This is due to the fact that the EL display 14 is charged to a high voltage and that the gate voltage must be greater than the source voltage, but there are no voltage sources that are higher in voltage than that impressed on the EL display 14.

Capacitor 126 is charged through H-bridge 19 diode 122 whenever N-channel FETs 140, 150 are ON. Capacitor 136 is charged through H-bridge 19 diode 132 whenever N-channel FETs 160, 170 are ON. Capacitors 126, 136 are initially charged up using the N-channel FETs 140, 160 which are connected in series with H-bridge 19 resistors 144, 164 just before starting the EL display 14 lighting sequence. The presence of resistors 144, 164 ensures that the current draw is not excessive when initially charging the uncharged capacitors 126, 136.

The operation of the circuit of FIG. 2 will be described assuming that capacitors 126, 136 are fully charged. The microcontroller 12 then selects a high leg and a low leg of H-bridge 19 by applying control signals so that N-channel FET 120 is turned ON by turning OFF N-channel FET 140, N-channel FET 130 is turned OFF by turning ON N-channel FET 160, N-channel FET 150 is turned OFF and that N-channel FET 170 is turned ON. The microprocessor 12 turns ON N-channel FET 110 and current flows through the inductor 114 to ground.

After a time determined by the microprocessor 12, N-channel FET 110 is turned OFF and current flow through inductor 114 to ground is interrupted. The flyback energy from the inductor 114 causes current to flow through diode 112, N-channel FET 120, line 18, the EL display 14 and N-channel FET 170. This causes the EL display 14 to become charged to the voltage induced by the inductor 114. The N-channel FET 110 is cycled by the microprocessor 12 so that several inductor 114 flyback pulses are sent to the EL display 14 while the H-bridge 19 is held in this state to increase the voltage applied across the lines 16, 18 until it attains the level required for the selected brightness.

After the required number of pulses, the EL display 14 is discharged by the microprocessor 12 turning ON the N-channel FET 140, which turns OFF N-channel FET 120, and leaving N-channel FET 170 ON. N-channel FET 140 is used instead of N-channel FET 150 because it has a series resistor 144 to limit the intensity of current flow. This helps minimize the presence of high current pulses so that Electro-Magnetic Interference (EMI) may be reduced.

The H-bridge 19 is then turned around by the microprocessor 12 selecting the controls lines so that N-channel FET 130 is turned ON, which turns OFF N-channel FET 160, N-channel FET 150 is turned ON and N-channel FET 170 is turned OFF. Several inductor flybacks are then sent to the EL display 14, causing the EL display 14 to be charged to the opposite polarity.

Once again, after the required number of pulses, the EL display 14 is discharged by turning ON N-channel FET 160, which turns OFF N-channel FET 130, and leaving N-channel FET 150 ON. N-channel FET 160 is used instead of the N-channel FET 170 because it has a series resistor 164 to limit the intensity of current flow. As previously mentioned, this helps minimize the presence of high current pulses so that Electro-Magnetic Interference (EMI) may be reduced, The H-bridge 19 is then turned around once more: N-channel FET 120 is turned ON, which turns OFF N-channel FET 140, N-channel FET 150 is turned OFF and N-channel FET 170 is turned ON. Several inductor flybacks are then sent to the EL display 14, causing the EL display 14 to be charged to the opposite polarity.

The purpose of diodes 142, 162 is to clamp the gates of N-channel FETs 120, 130 so that they do not become much more negative than the source voltage 9 when N-channel FETs 120, 130 are turned OFF. If they became more negative by, for example 20V, the gates oxides of N-channel FETs 120, 130 may be destroyed. Thus the microprocessor 12 provides a number of pulses to the EL display 14 with the H-bridge 19 in one configuration, discharges the EL display 14 and then provides a number of pulses with the H-bridge 19 in an opposite configuration. The flyback voltage caused by discharges of inductor 114 is applied to EL display 14 to determine the intensity of the display.

Figure 3:
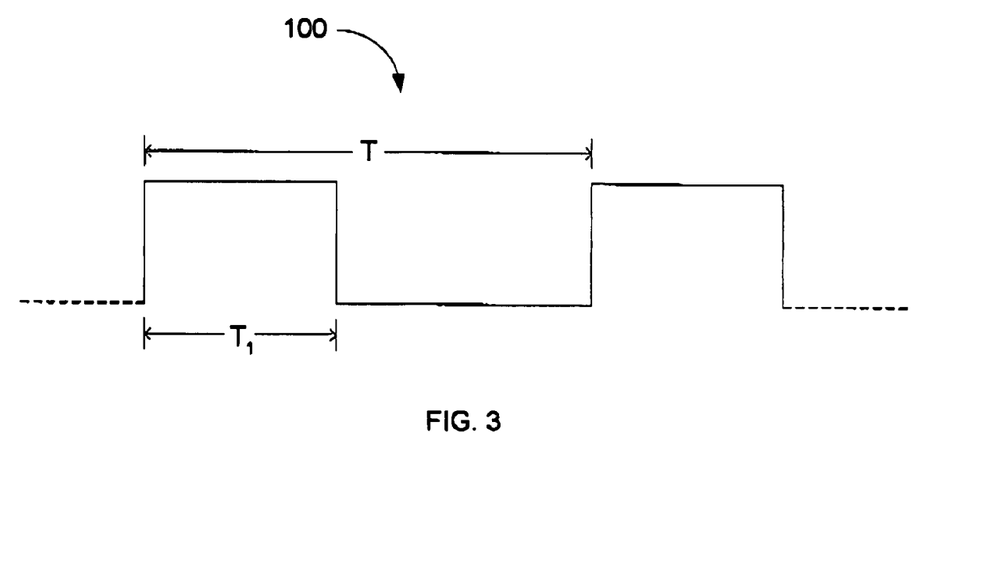
FIG. 3 is a simplified line diagram showing a period of an example of a pulse line used by the dimmer circuit.
Figure 4:
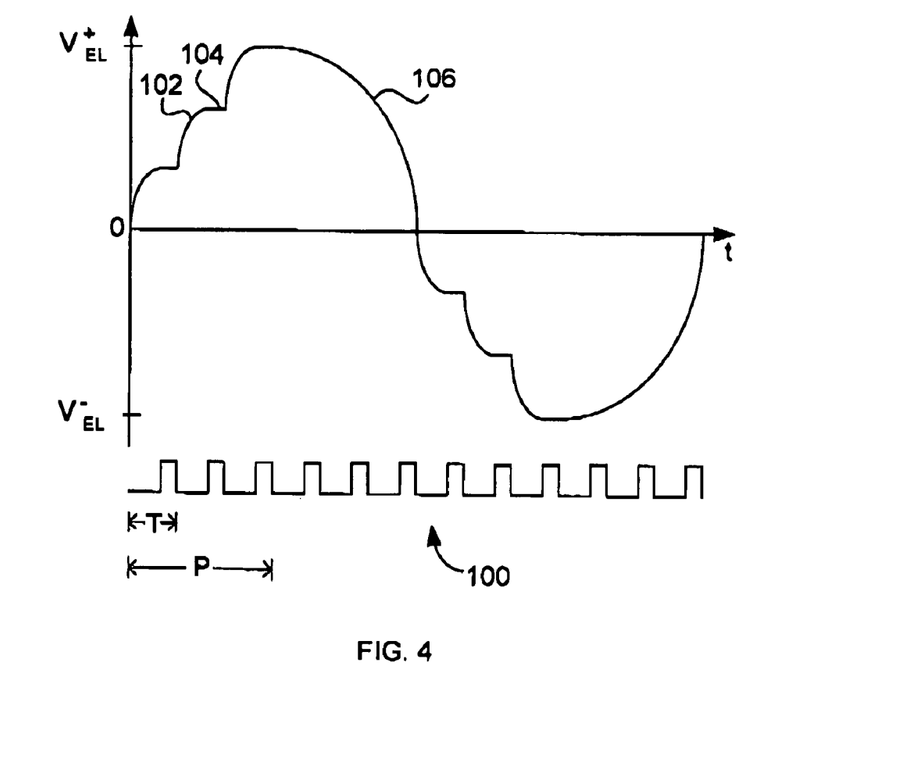
FIG. 4 is a simplified line diagram showing an example of the charging and discharging cycles in relation to a pulse line used by the dimmer circuit.

The microcontroller 12 controls the charging and discharging of inductor 114 by transmitting a pulse, on control line 210, to N-channel FET 110. By varying the charging and discharging durations, the intensity of the EL display 14 may also be varied. FIG. 3 shows an example of a period of such a pulse line 100 where T is the period of the pulse 100 and $T_1$ is the time the pulse 100 is HIGH. When the pulse 100 is HIGH, N-channel FET 110 is turned ON and inductor 114 is charged for $T_1$ seconds, then, when the pulse 100 is LOW, N-channel FET 110 is turned OFF and inductor 114 is discharged for $(T-T_1)$ seconds, which provides flyback energy to the EL display 14. FIG. 4 shows an example of the charging and discharging cycles of the EL display 14 in relation to a pulse 100 such as illustrated in FIG. 3. During the charging cycle of the EL display 14, when the pulse 100 is LOW, the flyback energy from the discharge of inductor 114 causes a rise 102 in the charge of the EL display 14 and when the pulse is HIGH, the charge of the EL display remains constant 104 while the inductor 114 is being charged. This stepwise charging continues until a predetermined number of pulses per polarity P is attained, at which time the charge of the EL display 14 has reached the required maximum value $V_{EL}$ across lines 16, 18 corresponding to the desired brightness level. The EL display 14 is then discharged 106, the H-bridge 19 is turned around so that the polarity is inversed, and the process is repeated. This process creates an alternating voltage across lines 16, 18 from voltage source 9.

Adjusting the duty cycle of the inductor 114 controls the amount of energy stored in the inductor 114 on each pulse. The duty cycle is the fraction of time the pulse 100 is HIGH during a pulse 100 period $T_1$ as described by Equation 1.

$$\text{duty cycle} = \frac{T_1}{T} \quad \text{Equation 1}$$

The amount of energy stored during each pulse is proportional to the inductance and the square of the current, as described by Equation 2.

$$E = \frac{LI^2}{2} \quad \text{Equation 2}$$

where L is the inductance value of inductor 114
I is the inductor's 114 current during the pulse.
This current may be expressed by Equation 3:

$$I = \frac{VT_1}{L} \quad \text{Equation 3}$$

where V is the voltage of voltage source 9,
$T_1$ is the time the pulse 100 is HIGH.

Varying the duty cycle varies the rate at which energy is transferred to the EL display 14, which therefore controls the power and hence brightness. The power may be approximated by:

$$P \approx E \cdot f \quad \text{Equation 4}$$

where E amount of energy stored during each pulse,
f is the frequency of the pulse 100.

Combining Equation 2, Equation 3 and Equation 4 gives Equation 5 in which the power is proportional to the square of the voltage of voltage source 9, the period and the square of the duty cycle of pulse 100, and inversely proportional to the inductance value of inductor 114.

$$P \approx \frac{1}{2} \cdot L \cdot \left(\frac{V}{L}T_1\right)^2 \cdot \left(\frac{1}{T}\right) \quad \text{Equation 5}$$
$$= \frac{1}{2} \cdot \frac{V^2}{L} \cdot \frac{T_1^2}{T} = \frac{1}{2} \cdot \frac{V^2}{L} \cdot \frac{T^2 \cdot DC^2}{T}$$
$$= \frac{1}{2} \cdot \frac{V^2}{L} \cdot T \cdot DC^2$$

where DC is the duty cycle of pulse 100.

Thus by varying the period and/or duty cycle the intensity of the EL display 14 may be varied.

Pulse 100 is generated by alternately setting control line 210 to HIGH for a duration of $T_1$ seconds and then to LOW for a duration of $(T-T_1)$ seconds. The timing of the HIGH and LOW portions of the pulse 100 may be achieved by translating times $T_1$ and $(T-T_1)$ into an equivalent number of instructions to be performed by the microcontroller 12. The number of instructions microcontroller 12 executes per second is determined by dividing its frequency by 4. For example, a microcontroller running off its internal 4 MHz clock executes 1,000,000 instructions per second or, in other words, one instruction is executed each 1 µs. Thus, correct timing is achieved by executing a number of instructions equal to:

$$\text{number of instructions} = \frac{T_1}{1 \ \mu s} \quad \text{Equation 6}$$

for the HIGH pulse; and $$\text{number of instructions} = \frac{(T - T_1)}{1 \ \mu s} \quad \text{Equation 7}$$

for the LOW pulse.

Figure 5:
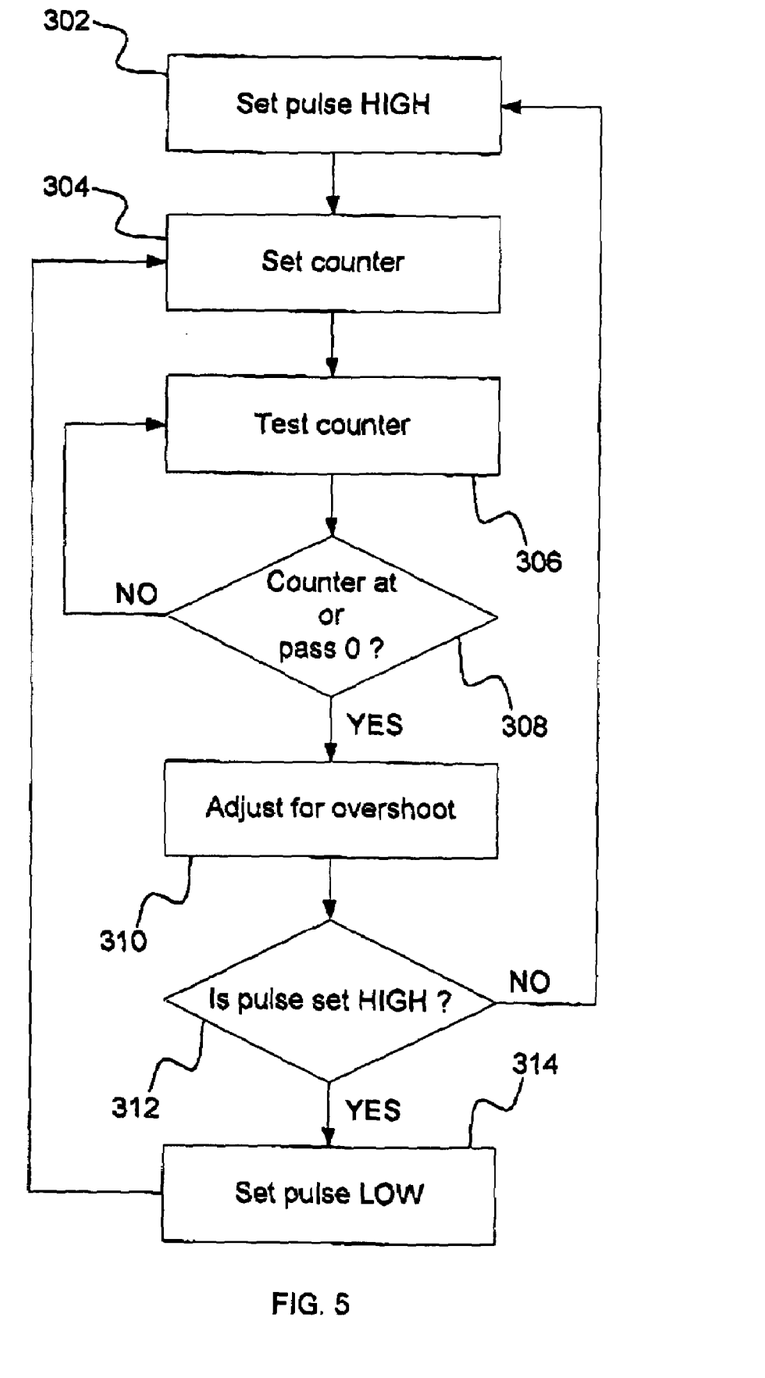
FIG. 5 illustrates a generalized flow chart of an algorithm to produce the charging/discharging pulse.

An example of an algorithm that may be executed by the microcontroller 12 to obtain pulse 100 is depicted by the flow chart shown in FIG. 5. In this example, an 8-bit microcontroller 12 is used, such as, for example, the PIC12C508A, which has a 4 MHz internal clock. The sequence of steps composing the algorithm is indicated by the sequence of blocks 302 to 314.

In block 302 the algorithm starts by setting the output of control line 210 to HIGH.

At block 304, a counter is set so that the proper number of instructions is executed in order to translate into the required time duration (e.g. $T_1$ or $(T-T_1)$ seconds depending if the control line 210 is presently at HIGH or LOW respectively). In the case of an 8-bit microcontroller 12, there is a circular counter that is increased every time an instruction is executed. The counter increases from 0 to 255, at which time it goes back to 0 and repeats the cycle. Thus, to count N instructions, the counter has to be set according to the following equation:

$$\text{counter value} = 256 - N \quad \text{Equation 8}$$

If a duration of 50 µs is required, using either Equation 6 or Equation 7, this translates into 50 instructions, the counter is then set to 206 (256−50). Since the setting of the counter, as well as the operation of testing the counter, take a number of instructions to perform, an offset must be added to the counter in order to compensate for those operations which require a number of instructions to execute. Accordingly, if setting the counter requires $N_s$ instructions and the testing of the counter $N_t$ instructions, Equation 8 becomes:

$$\text{counter value} = 256 - N + N_s + N_t \quad \text{Equation 8}$$

$N_s$ is added to the counter since the control line 210 has already been at either HIGH or LOW (depending on where in the pulse 100 sequence the algorithm is) for $N_s$ instructions at the time the counter is started. Similarly, $N_t$ is added to the counter because by the time the test is executed on the counter, the control line 210 will have already been at either HIGH or LOW (depending on where in the pulse 100 sequence the algorithm is) for $N_t$ instructions.

At block 306, the counter is tested, which operation takes $N_t$ instructions, which in turn increases the counter by that number.

Then, at block 308, the result of the test if checked to see if it the counter has reached or passed 0. If so, the algorithm proceeds to block 310. If not, the algorithm repeats the testing operation by going back to block 306.

Once the counter has reached or passed 0, at block 310 the algorithm determines if it has to execute additional instructions in order to compensate for testing operation the offset ($N_t$) that was added in setting the initial value of the counter. This is done because the testing of the counter is not instantaneous, which means that the counter may reach or pass 0 within a span of $N_t$ instructions. Thus the counter is being stopped within $N_t$ instructions of its desired value so that the next testing operation does not cause the counter to overshoot its desired value of N instructions. This requires from 1 to $N_t$ additional instructions to be executed for the count to reach a total of N instructions. Simple NOP (no operation) instructions may be used for this purpose.

At block 312, the algorithm checks if the control line 210 is presently at HIGH. If the control line 210 if not at HIGH, it will go back to block 302 where it will be set back to HIGH in order to start a new pulse 100 period. If the control line 210 is at HIGH, the algorithm proceeds to block 314 where the control line 210 if set to LOW and then proceeds to block 304 to complete the ongoing pulse 100 period.

Of course, depending on the implementation and the type of microcontroller used, the offsets may vary in order to provide for different coding structures which vary from one microcontroller type to another. As well, other timing methods may be used, such as, for example, a software loop with an interrupt when the counter reaches 0, depending once again on the type of microcontroller used.

Figure 6:
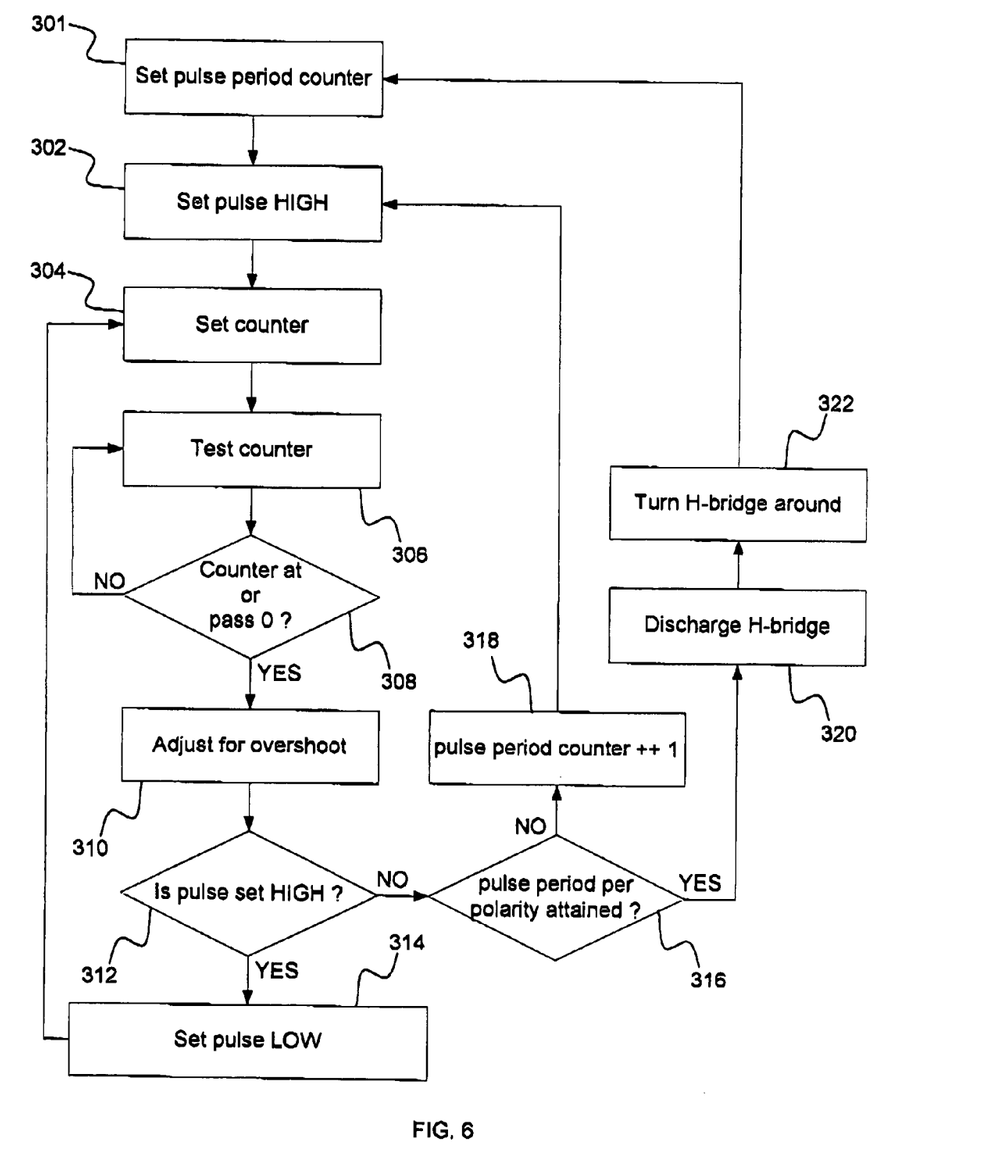
FIG. 6 illustrates a generalized flow chart of an algorithm to produce the charging/discharging pulse and the synchronization of the H-bridge operations.

The microcontroller 12 uses pulse 100 generated, for example, by the algorithm depicted in FIG. 5, to synchronize the discharging and turning around operations of the H-bridge. Building on the example depicted in FIG. 5, FIG. 6 depicts an algorithm that may be executed by the microcontroller 12 to obtain pulse 100 and synchronize the discharging and turning around operations of the H-bridge. The sequence of steps composing the algorithm is indicated by the sequence of blocks 301 to 322.

At block 301, the algorithm sets a pulse period counter to 1, this counter is used to count the number of pulse period that have been completed.

The sequence of blocks 302 to 314 behaves as described previously for the flow chart depicted by FIG. 5, with the exception of block 312 where the algorithm proceeds to block 316, instead of going back to block 302, whenever the condition of having the pulse set to HIGH is not met.

At block 316, the algorithm checks if the number of pulse period per polarity has been reached by verifying the value of the pulse period counter. If the number of pulse period per polarity has not been attained, the algorithm proceeds to block 318 where the pulse period counter is increased by 1 and then goes back to block 302 to start a new pulse period. On the other hand, if the number of pulse period per polarity has been attained, the algorithm proceeds to block 320 where the H-bridge is discharged followed by block 320 where the H-bridge is turned around. The sequence of N-channel FET activation or deactivation is detailed in the description of FIG. 2. N-channel FETs 140, 150, 160, 170 are activated by setting control lines 240, 250, 260, 270, respectively, to HIGH and deactivated by setting those same control lines to LOW. N-channel FETs 120, 130 are activated or deactivated by deactivating or activating associated N-channel FETs 140, 160 respectively. After the H-bridge 19 has been turned around, the algorithm goes back to block 301 where the pulse period counter is set back to 1 and the process starts over.

To provide for variation in intensity, the microcontroller 12 receives the values of $T_1$, T and the number of pulses per polarity from the main processor 30 through control line 230. The main processor 30 determines these values according to the brightness level selected by a user of the scanner 2, using a manual dimmer control 7 on the keyboard 6. Thus the primary adjustment of the intensity is through the manual dimmer control 7 on the keyboard 6.

The adjustability of the intensity may also be used to compensate for other operating conditions or changes in external parameters that may be encountered in use. To compensate for variation in the voltage source 9 during use, a voltage level monitor 32 is connected through monitor line 34 to the voltage source 9. The main processor 30 adjusts the values of $T_1$, T and the number of pulses per polarity according to variations in the available voltage level as the voltage source 9 discharges. Furthermore, an ambient light level detector 40 may be connected to the main processor 30 through monitor line 36 so that the main processor 30 may adjust the values of $T_1$, T and the number of pulses per polarity according to the level of ambient light, e.g. lowering the brightness level in low ambient light conditions and raising it in high ambient light conditions. The scanner 2 keyboard 6 may be provided with controls to enable or disable this feature.

The main processor 30 selects the appropriate values of $T_1$, T and the number of pulses per polarity by accessing, for example, a lookup table, provided with the main processor 30, that correlates the desired brightness level and optionally the available voltage level and ambient light level, to the required values for $T_1$, T and the number of pulses. These values are then transmitted to the microprocessor through control line 230.

When the main processor 30 sets control line 230 to LOW, the microcontroller 12 discharges the EL display 14 by enabling the appropriate FETs and the microcontroller 12 is put to sleep. Current consumption of the circuit 10 may be reduced if the microcontroller 12 discharges the EL display 14 for a few ms and then turns OFF N-channel FETs 140, 160 so that they do not allow current to flow through any H-bridge resistors 124, 134, 144, 164.

Although the present invention has been described by way of a particular embodiment thereof, it should be noted that modifications may be applied to the present particular embodiment without departing from the scope of the present invention and remain within the scope of the appended claims.

The invention claimed is:

1. A control circuit to vary the intensity of an electro luminescent display, said circuit being connected between a power source and a display, said circuit comprising a pair of conductors to be connected to said display for applying a voltage thereto, an inductor connected to said power source, a switch to control selectively energize said inductor, a gating circuit to selectively connect one or the other of said conductors to said inductor, and a controller operating upon said switch to vary the duty cycle of said switch to thereby vary energy stored in said inductor and operating upon said gating circuit to alternate periodically the relative polarity of said conductors, wherein said gating circuit includes a selectively operable switch for each conductor providing a discharge path for a respective one of said conductors, each said discharge path including a current limiting element in series with a respective switch between said conductor and said switch; and said inductor energizes said conductors through said gating circuit according to operation of said controller.

2. A control circuit according to claim 1 wherein said duty cycle is variable in response to changes in external parameters.

3. A control circuit according to claim 2 wherein said duty cycle is variable by manipulation of a manual control.

4. A control circuit according to claim 2 wherein said duty cycle is variable in response to variations in ambient light.

5. A control circuit according to claim 2 wherein said duty cycle is variable in response to variations in said power source.

6. A control circuit according to claim 2 wherein said controller includes a microprocessor and said duty cycle is determined by a look-up table operably connected to said microprocessor and monitoring said external parameters.

7. A control circuit according to claim 6 wherein a counter is set to determine the periods of said duty cycle and incremented by said microprocessor.

8. A control circuit according to claim 7 wherein said counter is offset to compensate for operation of said microprocessor.

9. A control circuit according to claim 1 wherein said controller enables said discharge path as said polarity is reversed.

10. A control circuit according to claim 1 wherein said current limiting element is a resistor.

11. A control circuit according to claim 1 wherein said gating circuit is an H-bridge.

12. A control circuit according to claim 11 wherein said H-bridge consists of N-channel FETs.

* * * * *

UNITED STATES PATENT AND TRADEMARK OFFICE
CERTIFICATE OF CORRECTION

PATENT NO. : 7,307,645 B2
APPLICATION NO. : 10/896055
DATED : December 11, 2007
INVENTOR(S) : Forsythe Page 1 of 1

It is certified that error appears in the above-identified patent and that said Letters Patent is hereby corrected as shown below:

In the Specifications:

In Column 1, Line 50, delete "power" and insert -- the power --, therefor.

In Column 1, Line 65, delete "scanner," and insert -- scanner. --, therefor.

In Column 2, Line 30, delete "N-chanel" and insert -- N-channel --, therefor.

In Column 2, Line 38, delete "an N-chanel" and insert -- a N-channel --, therefor.

In Column 2, Line 46, delete "N-chanel" and insert -- N-channel --, therefor.

In Column 3, Line 49, delete "reduced," and insert -- reduced. --, therefor.

In Column 4, Line 41, delete "2." and insert -- 2: --, therefor.

In Column 4, Line 47, delete "114" and insert -- 114, --, therefor.

Signed and Sealed this
Thirtieth Day of April, 2013

Teresa Stanek Rea
*Acting Director of the United States Patent and Trademark Office*